United States Patent Office 3,208,088
Patented Sept. 28, 1965

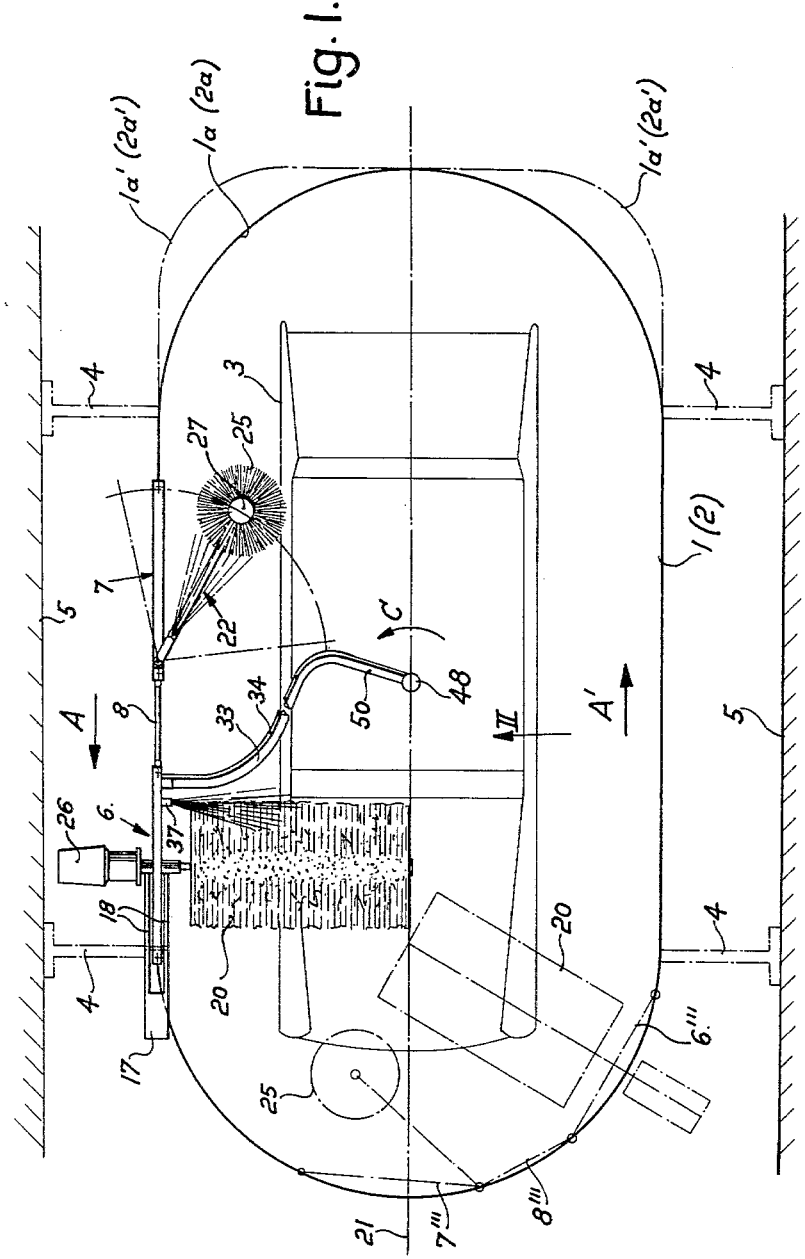

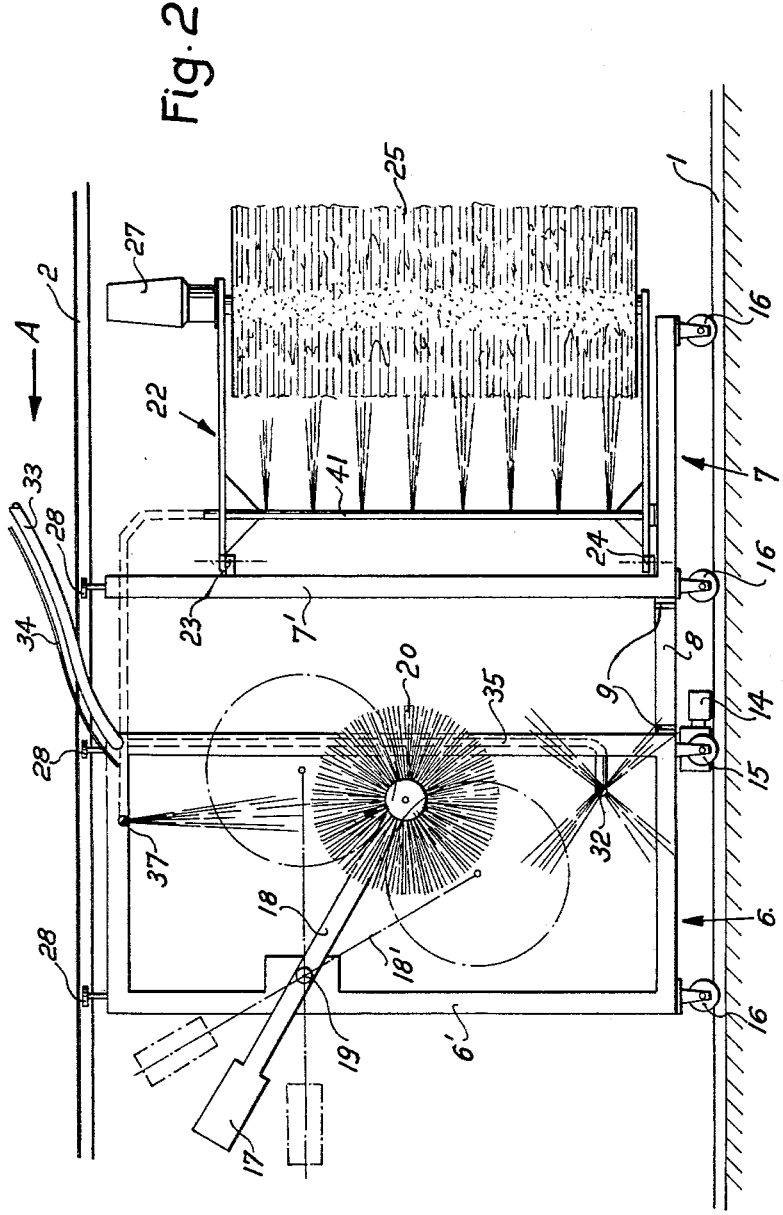

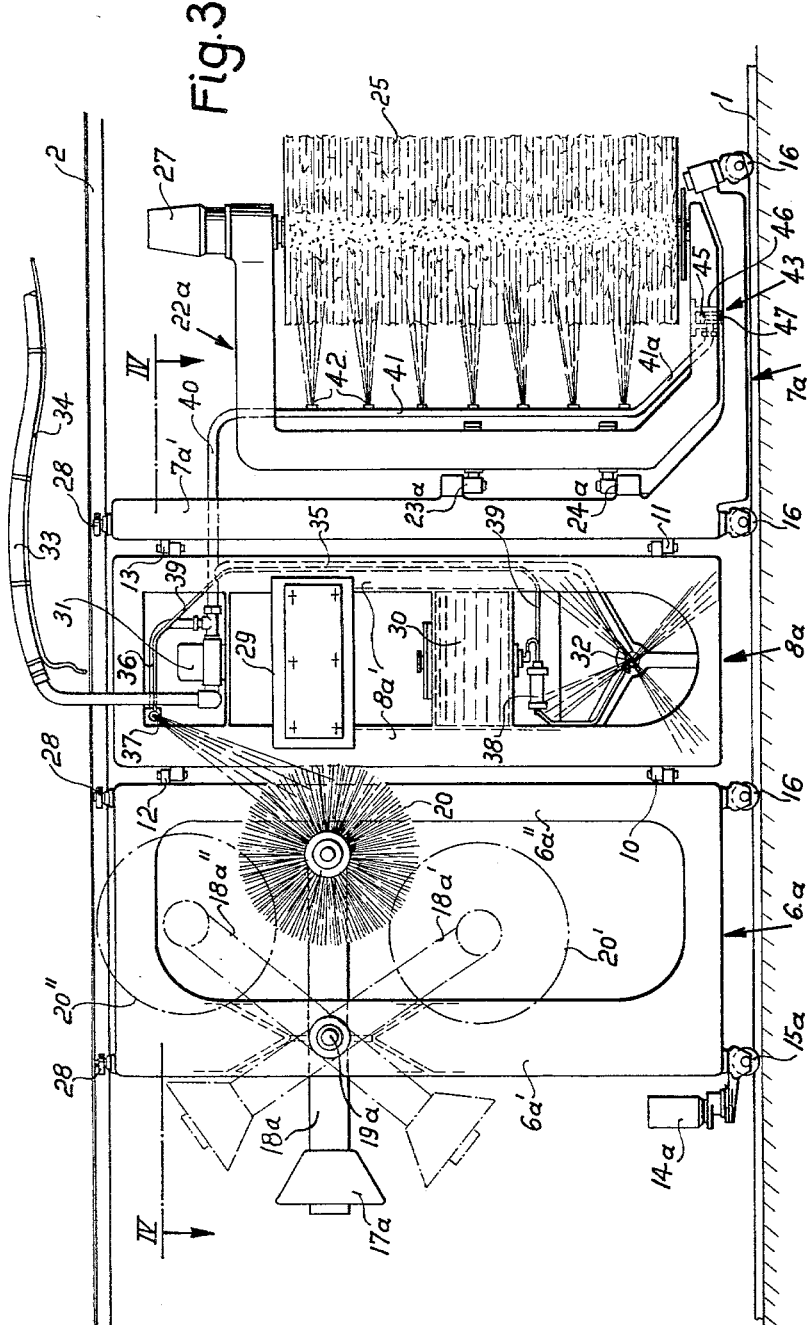

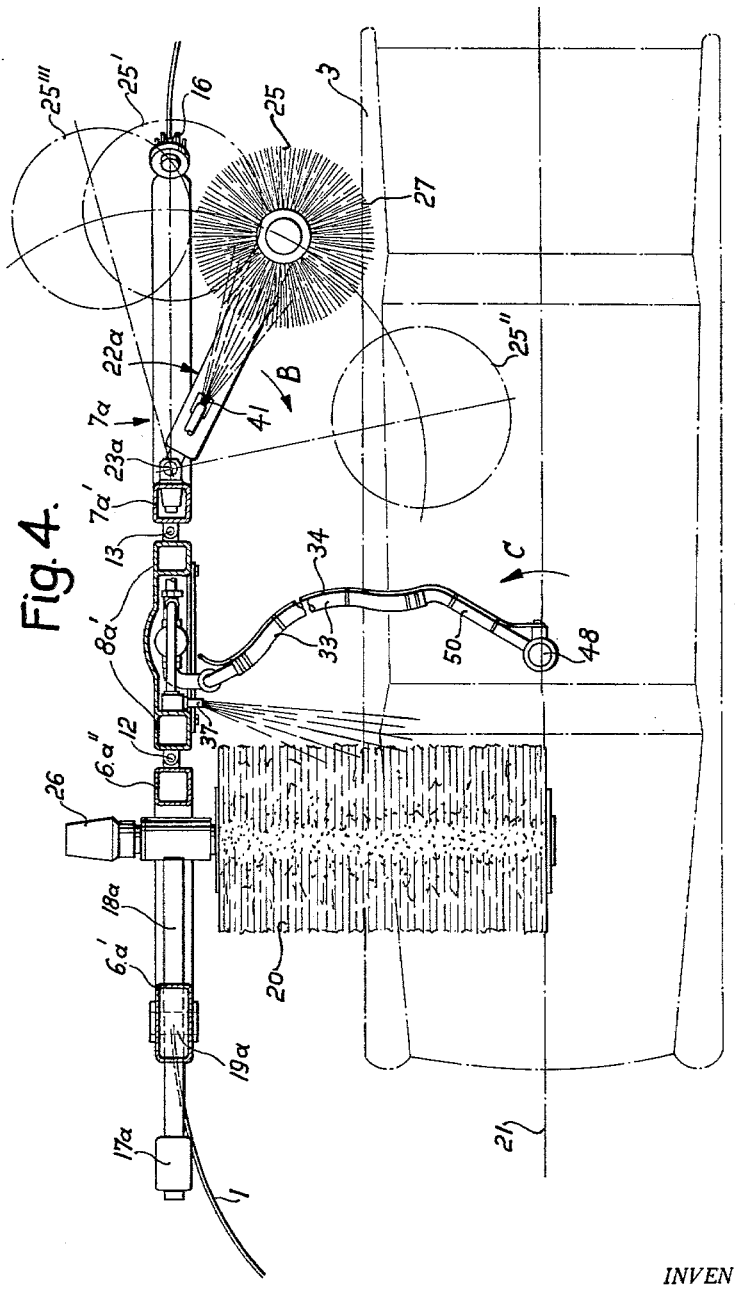

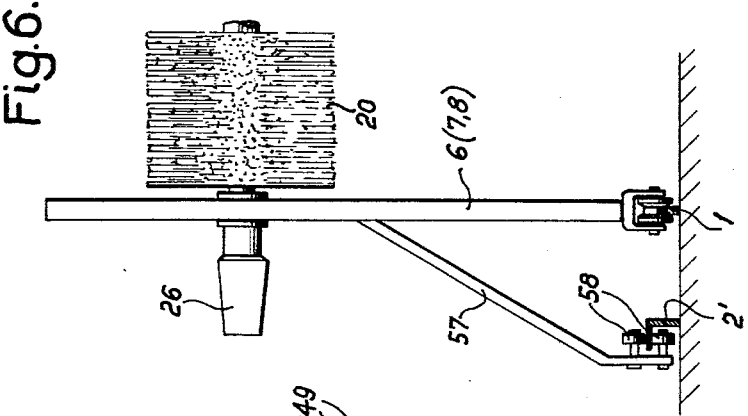
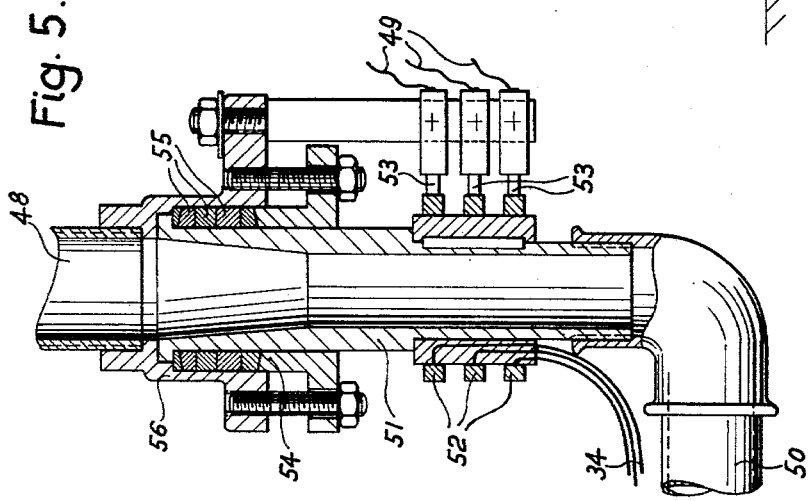

3,208,088
AUTOMATIC WASHING PLANT FOR VEHICLES, ESPECIALLY PRIVATE CARS
Johann Sulzberger, Hauptstrasse 5, Goggingen, near Augsburg, Germany, and Gebhard Weigele, Holzweg 75, Augsburg, Germany
Filed Aug. 7, 1963, Ser. No. 300,579
Claims priority, application Germany, Aug. 8, 1962, W 32,767
13 Claims. (Cl. 15—21)

The invention relates to an automatic washing plant for vehicles, especially private cars, consisting of brushes, rotating under water spray, which are swivel-mounted and pressed against the vehicle by means of a spring and/or by the force of gravity. In current types of washing plants the vehicle is passed through the washing area on the assembly line principle, during which period it moves past an arrangement of stationary, rotating brushes. Such automatic washing plants suffer from the disadvantage they require the installation of a new washing chamber, complete with expensive assembly line mechanism, in order to permit the vehicle to be moved therethrough. Furthermore in the case of such known washing plants at least three brushes, viz two lateral vertical brushes and one horizontal brush, covering the whole width of the vehicle, are required. In the case of this assembly line principle, moreover, the vehicle can be given only one wash.

The basis of this invention is, while avoiding the above-mentioned disadvantages, to produce an automatic washing plant for vehicles, which is characterised by an extremely simple design. According to the invention the automatic washing plant consists in principle of one closed-circuit, horizontal guide rail system, which encircles with an intervening space the perimeter of the vehicle, being rounded at the corners, and a power-driven vertical carriage, capable of movement around the circuit, on which are mounted consecutively a swivel-arm with a horizontal brush, reaching only to the central axis between the guide rails and a swivel-frame with one vertical brush.

This new automatic washing plant has the advantage that only two brushes are required, viz one vertical brush, extending approximately up to the top of the vehicle, and one relatively short horizontal brush. Moreover, the assembly line movement of the vehicles is eliminated, so that the new wash plant can be installed in any suitable wash chamber, including already existing wash chambers. The vehicle is cleaned during the passage of a single circuit by both brushes and the vehicle can, if necessary, undergo a second cleaning cycle by means of a second circuit of the brushes.

The details of the invention are explained in greater detail in the following paragraphs, on the basis of the embodiments of the invention shown in the accompanying drawings.

In the drawings:

FIG. 1 is a diagrammatic, top plan view of a washing plant according to the invention, FIG. 2 is a side view, on a larger scale, of the washing plant looking in the direction of the arrow II of FIGURE 1, FIG. 3 is a side view, similar to FIGURE 2, showing a further improved embodiment of the washing plant according to the invention, FIG. 4 is a sectional view taken along the line IV—IV in FIG. 3, FIG. 5 is a central sectional view through the water and electricity supply system of the washing plant, FIG. 6 is a front view of a washing plant carriage in a further embodiment of the invention.

In the forms of the invention shown in FIGS. 1 to 4 the closed-circuit guide rail system consists of lower and upper rails 1 and 2, which are arranged horizontally and parallel to each other and symmetrically about a common center point. The rails 1 and 2 encircle the vehicle 3 to be washed, indicated at 3 in FIGURE 1, and are spaced therefrom, said rails being rounded at the corners. The guide rails 1 and 2 may have end portions which consist of a single arcuate portion 1a and 2a, in which case the rails are substantially oval in plan view. Alternatively, the rails 1 and 2 may be substantially rectangular in plan view with rounded corners 1a' and 2a'. The one guide rail 1, formed as a runway rail, rests on the ground, while the other guide-rail 2 is placed above the top of the vehicle, this latter guide rail being secured for this purpose to the walls 5 of the washing chamber by the support brackets 4. The two embodiments of the invention shown in FIGURES 1 and 2 and FIGURES 3 and 4, respectively, are comprised of a number of similar parts. Accordingly, the description will proceed primarily with reference to FIGURES 1 and 2 and corresponding parts in FIGURES 3 and 4 will be indicated by the same reference numeral with the suffix "a" added thereto. The two guide rails 1 and 2 serve to guide a carriage, which, in the embodiment shown in FIGURES 1 and 2, consists of two carriage sections 6 and 7 disposed one behind the other with a space therebetween. The carriage sections are joined together by a connecting section 8 in such a way that this connecting section is joined in articulated fashion with the two carriage sections at 9 (FIGURES 1 and 2) and 10–13 (FIGURES 3 and 4). This carriage moves counter-clockwise in the direction indicated by arrows A and A'. Power is supplied to move the carriage by an electric motor 14 and, which, via a transmission gear, drives a roller 15 and on the carriage. The remaining rollers on the carriage engaging the rail 1 are marked 16.

As can be seen from the drawing, a swivel arm 18, fitted with a counter-weight 17, is mounted on the carriage section 6 at the point 19. This arm carries a horizontal brush 20, which, as is apparent from FIGS. 1 and 4 only reaches as far as the central line 21 between the lengthwise extending portions of the guide rails 1, 2. On carriage section 7 a U-shaped frame 22 is swivel-mounted at 23, 24. This swivel-frame carries a vertical brush 25. The two brushes 20 and 25 are driven by electric motors 26 and 27.

On the upper guide rail 2, formed in an appropriate U shape, run the guide-rollers 28 of the carriage sections. It is advantageous for the carriage section 6 to consist of a rectangular frame, on the front vertical frame member 6' of which is mounted the swivel arm 18 and which extends rearwardly therefrom. The other carriage section 7 is formed in an L-shape, on the long vertical leg 7' of which is mounted the swivel frame 22, which frame extends rearwardly from the leg 7'.

In order to ensure a stable connection between the two carriage sections and prevent the possibility of overturning, in the construction shown in FIGS. 3 and 4, the connecting section 8a is formed as a rectangular framework, corresponding in height to the carriage sections 6a, 7a. Both vertical frame members 8a' of the connecting section 8a are joined adjacent their upper and lower ends to the carriage sections 6a and 7a by the joints 12, 13 and 10, 11. These carriage sections are preferably constructed of cast light metal and have a rectangular, hollow cross-section, as is apparent from FIG. 4 in the case of 6a', 6a'', 8a' and 7a'. In the carriage section 6a a slit is provided for receiving the swivel-arm; this slit being shaped in such a way that the swivel-arm can move through a wide angle. In FIG. 3 the swivel-arm 18a is shown by means of a solid line in its rest position, while the broken lines 18a' and 18" show the lowest and highest operating positions of the swivel arm and the brush 20. In FIG. 4 the rest position of the vertical brush at 25' is shown by means of a dot and dash line and its operating position is shown in solid lines. The innermost and outermost operating positions 25" and 25''' are shown by means of dot and dash lines. The brush 25 is urged in the direction indicated by arrow B against the vehicle by the force of a spring in a conventional manner. As shown in FIGURE 3 an electrical switch box 29 is located within the connector frame 8a, together with a cleaning agent container 30. This connector frame 8a contains, moreover, a magnetic valve 31 and a spray jet 32, used for spraying the under side of the vehicle. A hose 33 is, furthermore, provided and a cable 34, suitably connected to the hose, whereby water and electric current are fed to the carriage. The water, controlled by the magnetic valve 31, is fed by means of a pipe connection 36 to the spray pipe 37, used for spraying the brush 20. The connector frame 8a also contains a hydraulic cylinder 38, by means of which the cleaning agent from the container 30 is fed via a pipe connection 39 to the spray pipe 37. The water is, moreover, fed from the magnetic valve 31 via a hose 40 to a spray pipe 41, located in the swivel frame 22a, from which the water is sprayed through the jets 42 on to the brush 25.

There can be provided, if desired, between the carriage 7a and the swivel frame 22a a releasable locking device, which holds the brush 25 outside their operating field, i.e. in the rest position, referred to above. In order to unlock this locking device, a piston 45, acted on by the pressure of water in the washing plant, is fitted in each case in a cylinder 46, this piston being connected with the locking member. The piston rod 47 is suitably shaped to form the locking member (latch). The piston 45 is under load by a spring, which is not shown, so that in the rest position the end of the piston rod 47 rests in a corresponding recess in the carriage section 43. The cylinder 46 is attached to the end 41a of the jet pipe 41. As soon as the magnetic valve 31 releases the supply of water to the jet pipe 41, the pressure of water on the piston 45 releases the locking mechanism 47, so that the swivel frame 22a is then released and the brushes swivel from the rest position 25' to the operating piston 25 against the vehicle being washed.

As can be seen from the drawing, the carriage is connected by means of the hose 33 and the cable 34 to a stationary water 48 and electricity 49 supply, which is disposed centrally in relation to the guide rail system 1, 2. The hose 33 is connected to the horizontal section 50 of an angle-pipe. The vertical section 51 of the angle pipe is connected to and is rotatable with respect to the water supply 48. This rotatable vertical pipe section 51 carries sliding contact rings 52 connected to the cable. Electric current is supplied to these rings 52 from the electricity supply 49 by sliding contacts 53. In order to seal the water supply 48, 51, a packing gland 54 is provided, which presses sealing rings 55 into the seating 56, which is firmly attached to the pipe 48. When the washing carriage is moving round the circuit in direction A, the layout described above enables the angle-pipe 50, 51 to be swivelled by the hose 33 in direction C.

The method of operation of the automatic wash plant, described above, is as follows:

The vehicle 3 is driven into the washing chamber in such a way that it is positioned in the center of the guide rail system 1, 2. The washing carriage can in this case occupy any desired starting position, such as are shown for example at 6''', 7''', 8''' by the dot and dash lines in FIG. 1, the brushes being outside their field of operation in the previously-described rest position. After the electric current has been switched on, the two brushes 20 and 25 are set in motion and at the same time the magnetic valve 31 is opened, so that the supply of water is released to all the spray jets and also to the locking cylinder 46, if used. As a result of the water pressure, the swivel frame 22a is unlocked, so that the vertical brush 25 is swivelled to the operating position at 25 on the front side of the vehicle. The carriage motor 14 and 14a is then brought into operation (by a delay relay), so that the two brushes 20 and 25 described a circuit round the vehicle. The horizontal brush 20 cleans initially only half of the upper surface of the vehicle during movement in direction A, and during further movement in direction A the other half of the upper surface as well. During this circuit the vertical brushes 25 clean not only the two side surfaces of the vehicle but also the front and the rear.

The invention is not limited to the embodiments of the construction, described above. It is possible, for example, if required, to produce a single-section carriage in place of the multiple-section carriage. It is, furthermore, possible for the carriage to operate as shown in FIG. 6. In this case, in addition to the runway rail 1, a further guide rail 2' is provided on the ground, along which the carriage sections 6 and 7 and 8 can additionally be guided. For this purpose each of the carriage sections is provided with a support bracket 57, having guide rollers 58 lying above and below the horizontal flange of guide rail 2' to prevent the carriage sections overturning.

If required, the closed-circuit guide rail system may also consist of a single runway rail above the level of the vehicle, on which the vertically suspended carriage is run.

In the washing plant, described by the invention, it is possible to wash not only private cars, but also delivery vans, which require washing of the upper surface of the vehicle, in the same way as for private cars.

We claim:
1. An automatic washing plant for motor vehicles, especially passenger cars, comprising:
   an elongated, endless, horizontal guide rail system defining the perimeter of an elongated zone in which a vehicle can be placed so that the vehicle is encircled by, and is spaced from said guide rail system, said guide rail system having rounded off corners at the longitudinal ends thereof;
   a carriage mounted on said rail system for movement therealong and power means for moving said carriage along said guide rail system;
   a swivel arm mounted on said carriage for pivotal movement about a substantially horizontal axis and a substantially horizontal brush rotatably mounted on said arm and extending at least to the lengthwise centerline of said zone for engaging the upper surfaces of a vehicle in said zone;
   a swivel frame mounted on said carriage for pivotal movement about a substantially vertical axis and an upright brush rotatably mounted on said swivel frame for engaging the sides and front and rear ends of a vehicle in said zone.
2. An automatic washing plant according to claim 1, in which the guide rail system is comprised of two vertically spaced, parallel rails, one of said rails being mounted on a floor and the other rail being supported so as to be above the top of the vehicle.
3. An automatic washing plant according to claim 1, in which the guide rail system is comprised of two endless rails arranged in substantially the same plane and spaced horizontally from each other.
4. An automatic washing plant according to claim 1, in which the carriage is comprised of two serially arranged carriage sections, and an intermediate connector section connected by articulated joints to both carriage sections.

5. An automatic washing plant according to claim 4, in which one carriage section is comprised of a rectangular frame having a pair of uprights, said swivel arm being mounted on the front one of said uprights and extending toward the rear and carrying the horizontal brush, and the other carriage section being L-shaped and having a long upright leg on which is mounted the swivel frame, said swivel frame being U-shaped and extending toward the rear and carrying the upright brush.

6. An automatic washing plant according to claim 4, in which the connector section is a rectangular frame corresponding in height to the height of the carriage sections, and having two vertical frame elements which are attached adjacent their upper and lower ends by articulated joints to the carriage sections.

7. An automatic washing plant according to claim 4, in which the carriage sections and the connector section are formed of rectangular, hollow structural members.

8. An automatic washing plant according to claim 4, in which a switch box and a cleaning agent container are mounted in the connector section.

9. An automatic washing plant according to claim 1, in which a releasable locking mechanism is fitted between the carriage and the swivel frame for releasably retaining the upright brush out of contact with the vehicle.

10. An automatic washing plant according to claim 9, including a magnetic valve for controlling the supply of water to the washing plant and further including a piston responsive to the pressure of the water in the washing plant and which is connected to the locking mechanism for releasing same.

11. An automatic washing plant according to claim 1, in which the carriage is connected by means of a hose and electric cable means to a stationary water and electricity supply, said supply being located centrally in relation to the guide rail system, an angle pipe having a horizontal section and a vertical section, the hose being connected to the horizontal section of said angle pipe and the vertical section being mounted on and for rotation with respect to the water supply, said vertical section being fitted with sliding contact rings which are connected to said cable, and sliding contacts for supplying electric current to said rings.

12. An automatic washing plant for motor vehicles, especially passenger cars, comprising:
- an elongated, endless, horizontal guide rail system defining the perimeter of an elongated zone in which a vehicle can be placed so that the vehicle is encircled by, and is spaced from said guide rail system, said guide rail system having rounded off corners at the longitudinal ends thereof;
- a carriage mounted on said rail system for movement therealong and power means for moving said carriage along said guide rail system;
- an arm mounted on said carriage for substantially vertical movement and a substantially horizontal brush rotatably mounted on said arm and extending at least to the lengthwise centerline of said zone for engaging the upper surfaces of a vehicle in said zone;
- a frame mounted on said carriage for substantially horizontal movement and an upright brush rotatably mounted on said frame for engaging the sides and the front and rear ends of a vehicle in said zone.

13. An automatic washing plant for motor vehicles, especially passenger cars, comprising:
- an elongated, endless, horizontal guide rail system defining the perimeter of an elongated zone in which a vehicle can be placed so that the vehicle is encircled by, and is spaced from said guide rail system, said guide rail system having rounded off corners at the longitudinal ends thereof;
- a carriage mounted on said rail system for movement therealong and power means for moving said carriage along said guide rail system;
- a substantially horizontal brush and means rotatably supporting said horizontal brush on said carriage, said horizontal brush extending at least to the lengthwise centerline of said zone for engaging the upper surfaces of a vehicle in said zone; and
- an upright brush and means rotatably supporting said upright brush on said carriage so that said upright brush is engageable with the sides and the front and rear ends of a vehicle in said zone.

No references cited.

CHARLES A. WILLMUTH, *Primary Examiner.*

UNITED STATES PATENT OFFICE
CERTIFICATE OF CORRECTION

Patent No. 3,208,088                      September 28, 1965

Johann Sulzberger et al.

It is hereby certified that error appears in the above numbered patent requiring correction and that the said Letters Patent should read as corrected below.

Column 6, line 41, strike out "No references cited." and insert instead the following References Cited by the Examiner
UNITED STATES PATENTS

| | | |
|---|---|---|
| 2,579,866 | 12/51 | Rousseau---------15 |
| 2,703,579 | 3/55 | Merancy et al----15 |
| 3,035,293 | 5/62 | Larson-----------15 |

FOREIGN PATENTS 1,236,015      6/60        France.

Signed and sealed this 14th day of June 1966.

(SEAL)
Attest:

ERNEST W. SWIDER                      EDWARD J. BRENNER
Attesting Officer                     Commissioner of Patents